United States Patent [19]
Sprague, II

[11] Patent Number: 6,098,956
[45] Date of Patent: Aug. 8, 2000

[54] ELECTRICALLY OPERATED RECREATIONAL VEHICLE DRAIN VALVE

[75] Inventor: David L. Sprague, II, Battle Creek, Mich.

[73] Assignee: Barker Manufacturing Company, Inc., Battle Creek, Mich.

[21] Appl. No.: 08/852,452

[22] Filed: May 7, 1997

[51] Int. Cl.[7] .................................................. F16K 31/02
[52] U.S. Cl. ................ 251/129.11; 251/250; 248/231.61
[58] Field of Search ........................... 251/129.11, 129.2, 251/250; 248/231.61, 231.41

[56] References Cited

U.S. PATENT DOCUMENTS

| | | | |
|---|---|---|---|
| 1,657,038 | 1/1928 | Ross | 248/231.41 |
| 1,907,043 | 5/1933 | Crockett et al. | 248/231.41 |
| 3,987,812 | 10/1976 | Nelson | 137/219 |
| 4,545,363 | 10/1985 | Barchechat et al. | 251/129.11 |
| 4,548,384 | 10/1985 | Harding | 251/250 |
| 4,650,159 | 3/1987 | Shimamura | 251/129.11 |

FOREIGN PATENT DOCUMENTS

| | | | |
|---|---|---|---|
| 361268543A | 11/1986 | Japan | 248/231.61 |
| 417424 | 10/1934 | United Kingdom | 251/250 |

*Primary Examiner*—Gregory Huson
*Assistant Examiner*—Joanne Y. Kim
*Attorney, Agent, or Firm*—Young & Basile, P.C.

[57] ABSTRACT

An electrically operated drain valve for recreational vehicles economically fabricated primarily of synthetic plastic parts which is relatively free of corrosion at critical areas and readily retrofitted to existing recreational vehicle drain systems. A housing containing a geared reversible electric motor operating a linear displaceable rack associated with the drain valve operator permits the drain valve to be displaced between open and closed positions.

4 Claims, 2 Drawing Sheets

ELECTRICALLY OPERATED RECREATIONAL VEHICLE DRAIN VALVE

BACKGROUND OF THE INVENTION

1. Field of the Invention

The invention pertains to electrically operated drain valve operators for recreational vehicles which may be readily retrofitted to existing drain systems.

2. Description of the Related Art

Waste water systems for recreational vehicles include receptacles which collect the water and are periodically drained into septic tanks and other waste receiving sewer systems. The valve controlling the flow of waste water from the vehicle receptacle is located under the vehicle and requires the user to reach under the vehicle to operate the valve mechanism. Such manual operation of the drain valve is inconvenient, often soils the operator, and this task is one of the most annoying for recreational vehicle users.

To eliminate some of the problems attendant with waste water disposal, proposals have been made to electrically operate the vehicle drain valve as shown in U.S. Pat. No. 4,875,504. However, previously available electrically operated drain valve actuators are expensive, subject to corrosion, and may not be easily retrofitted to existing recreational vehicle plumbing systems.

OBJECTS OF THE INVENTION

It is an object of the invention to provide an electrically operated drain valve actuator for recreational vehicles which is economical to manufacture and may be readily retrofitted to existing vehicle plumbing systems.

Another object of the invention is to provide an electrically operated recreational vehicle drain valve actuator which is largely formed of a non-corrodible material, is lightweight and may be readily retrofitted to existing vehicle plumbing Systems requiring minimal skills.

SUMMARY OF THE INVENTION

The drain valve operator mechanism is mounted upon a tubular drain valve stem neck by bolted clamping plates. The operator includes a lower synthetic thermoplastic base plate to which a molded synthetic thermoplastic cover is removably attached. The base plate includes a guide in which a geared rack is capable of linear displacement in opposite directions under the influence of a pinion gear meshing therewith rotated by a transmission powered by a bi-directional electric motor.

The geared rack includes an extension attached to the valve stem wherein linear motion of the rack produces a like movement of the drain valve. Accordingly, by controlling the direction of rotation of the motor, the direction of rack displacement may be controlled, and the position of the valve regulated.

The molded synthetic plastic material of which the base plate and cover are formed permits the components to be economically produced of non-corrodible material, and the configuration of the mechanism is concise so as to be easily installable in relatively tight quarters. By employing a bolt-on clamping plate for attaching the drain operator to the drain mechanism, only ordinary mechanical skills are required by the installer.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
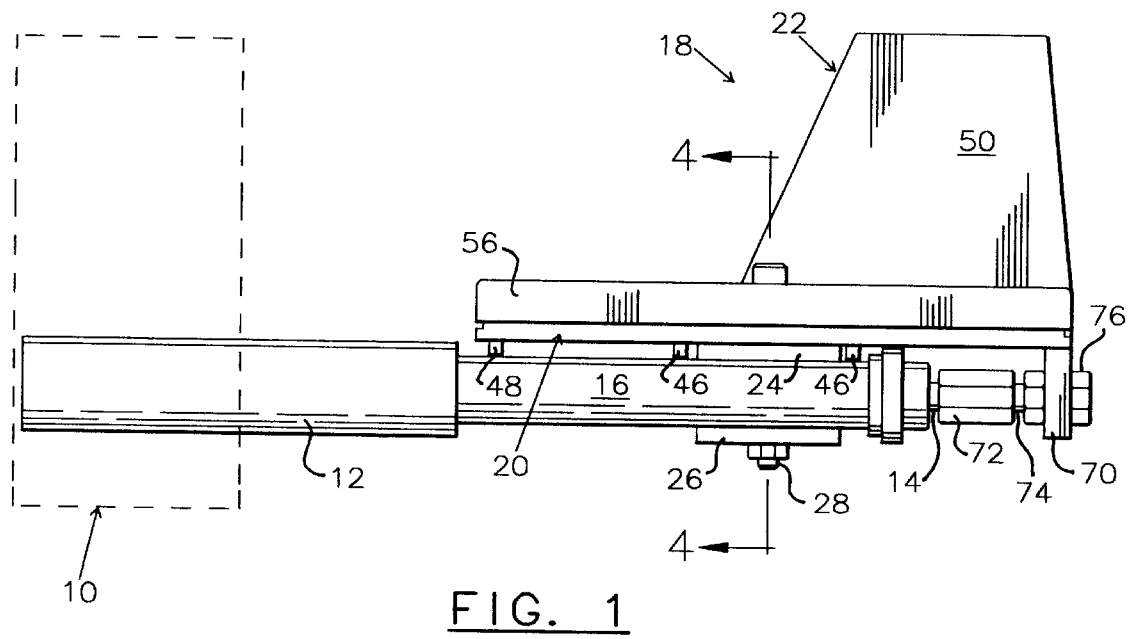
FIG. 1 is a side elevational view of an electrically operated recreational vehicle drain valve operator in accord with the invention.
Figure 2:
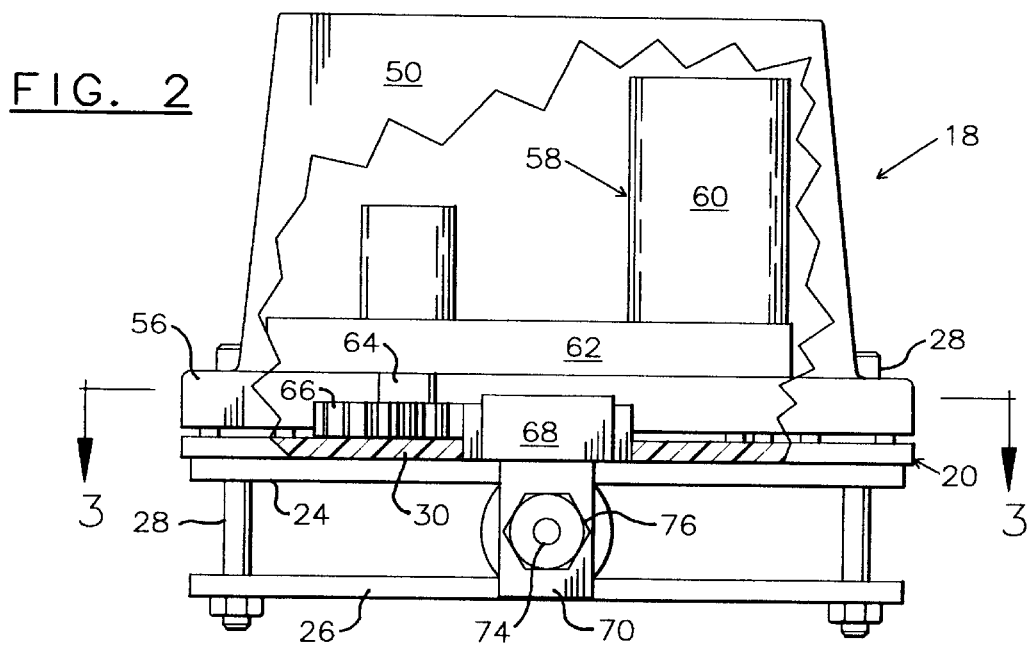
FIG. 2 is a front elevational view of the drain operator as taken from the right of FIG. 1, portions of the cover being broken away to illustrate the motor and transmission.

As shown in FIG. 1, a conventional drain valve housing 10 for a recreational vehicle is illustrated in dotted lines, and this housing includes the usual plumbing conduits associated therewith wherein a waste receiving receptacle communicates with the valve housing 10 such that opening and closing of the valve 12 permits the waste receptacle to be emptied, as is well known. The valve 12 includes an opening, not visible in FIG. 1, and is linearly positionable between the open and closed positions by the valve stem 14 which extends through the cylindrical valve housing stem neck 16. The stem 14 consists of a metal rod having a threaded end to which a handle is normally attached wherein pulling and pushing upon the handle will position the stem and valve 12 between open and closed positions.

The valve operator constituting the invention is generally indicated at 18, and includes a base plate 20 and a cover 22. The base plate 20 and cover 22 are preferably molded of a synthetic plastic material, and the valve operator 18 is mounted upon the stem neck 16 by an upper plate 24 and a lower plate 26 which clamp the valve neck and are pulled toward each other by bolts 28 passing through the valve operator and the clamping plates.

The base plate 20 includes a bottom 30 having a peripheral edge 32 which extends upwardly. Corner bosses 34 of a cylindrical configuration integrally extend upwardly from the bottom 30 tangential to the lower plate corners, and central bosses 36 are also formed in the base plate, FIG. 3.

Figure 3:
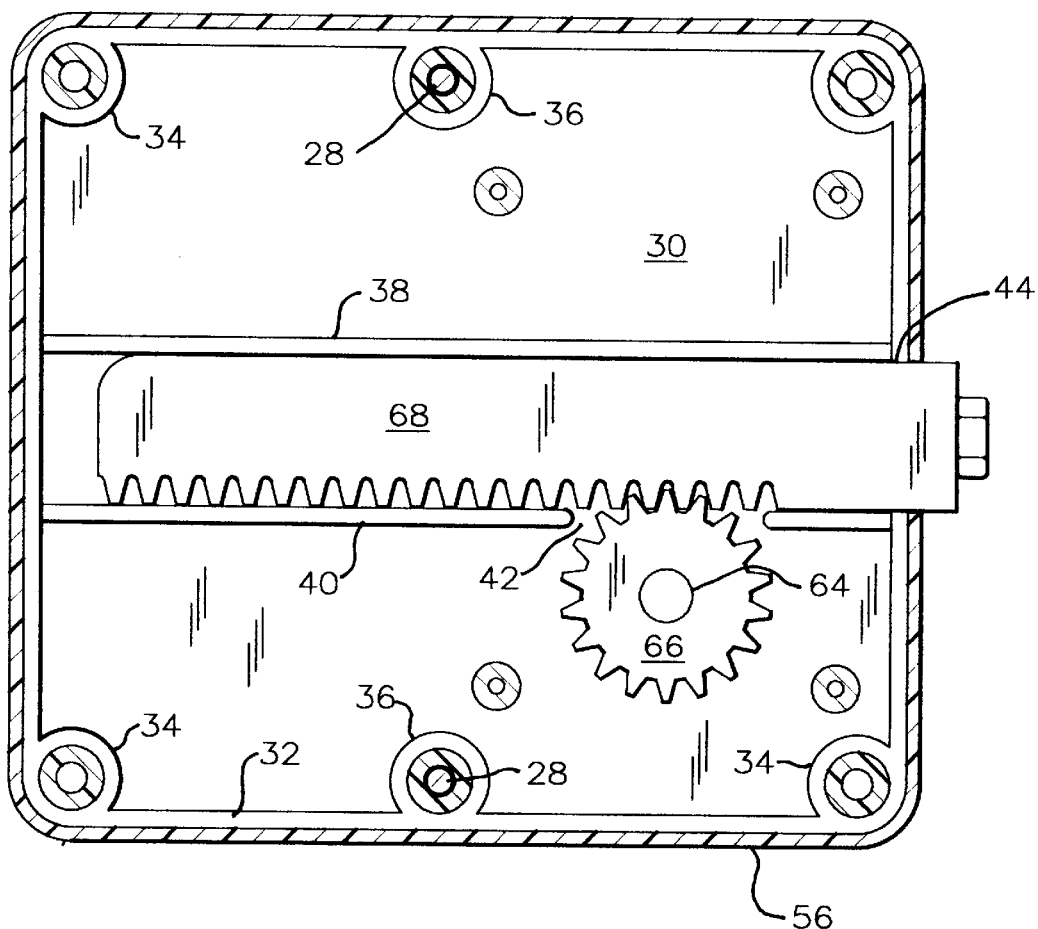
FIG. 3 is a plan elevational sectional view taken through the base plate and lower regions of the cover along Section 3—3 of FIG. 2.

A linear rack guide 38 is molded into the base plate, and spaced and parallel thereto is the rack guide 40 which includes an opening 42, FIG. 3, which provides gear access to the rack as will be later described.

An opening 44 is defined in the base plate periphery in line with the guides 38 and 40, and on its underside, the base plate bottom 30 is provided with a pair of clamping plate ribs 46 between which the plate 24 is located, and a rear rib 48, FIG. 1, which rests upon the upper portion of the stem neck 16. In this manner, the base plate 20 is maintained substantially parallel to the length of the stem 14 in view of the engagement of the ribs 46 and 48 with the stem neck.

Figure 4:
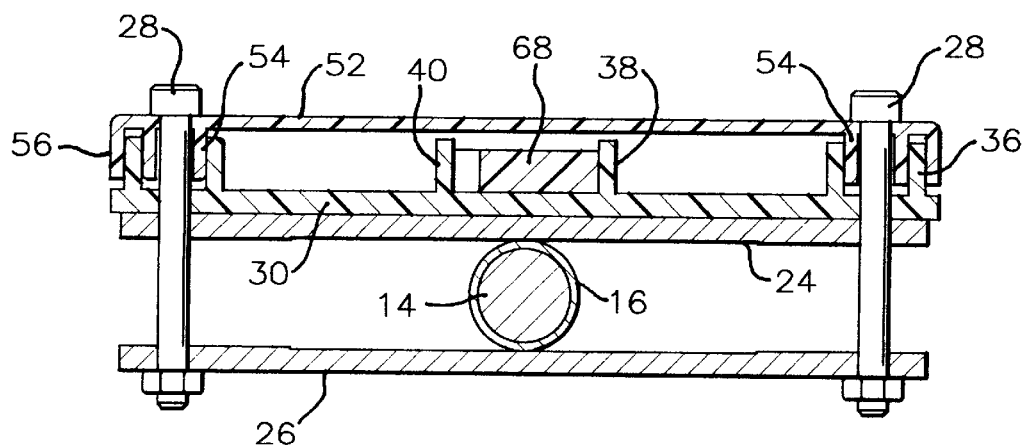
FIG. 4 is an elevational sectional view as taken along Section 4—4 of FIG. 1.

The cover 22 includes an upwardly extending crown 50, and a generally planar apron 52 extending over the base plate 20. The cover 22 includes cylindrical sleeves 54 which are received within the bosses 34 and 36, and screws, not shown, are interposed between the sleeves 54 and their associated bosses for maintaining the base plate 20 and cover 22 in an assembled relationship. The cover periphery is defined by a downwardly extending lip 56 which closely encircles the base plate edge 32 as will be appreciated from FIG. 4.

The drive unit 58 is located within the valve operator 18 and includes a 12 volt reversible DC electric motor 60 which drives a geared transmission 62 having a downwardly extending output shaft 64. A pinion gear 66 is mounted upon the shaft 64, and as will be appreciated from FIG. 3, the pinion gear 66 extends through the rack guide opening 42 for engagement with the teeth of a linear rack 68 slidably positioned between the guides 38 and 40, FIG. 3.

The rack 68 includes a downwardly extending extension 70, FIG. 1, and a coupling nut 72 mounted upon the threaded end of the valve stem 14 permits a threaded extension 74 to coaxially extend from the stem 14. The extension 74 passes through an opening in the rack extension 70 and the rack is adjustably connected to the stem 14 by the use of lock nuts 76, FIG. 1.

The valve operator 18 is mounted upon the valve stem neck 16 by the plates 24 and 26, the plates being mounted upon the upper and lower portions of the stem neck, respectively. Bolts 28 extend through holes defined in the plates, and extend through the central bosses 36 such that the tightening of the nuts on the bolts 28 firmly attaches the valve operator 18 upon the stem neck 16. The rack 68 is connected to the stem 14 through the coupling 72 and the threaded extension 74 by means of the lock nuts 76.

Thereupon, upon energizing of the electric motor 60, the pinion gear 66 is rotated in the desired direction to linearly shift the rack 68 and extend or retract the valve stem 14 for the opening and closing of the valve 12. The electric motor 60 is operated by a conventional three position switch, not shown, movable between "off", "open" and "closed" positions to position the valve 12 as desired, and such switch may be located at any convenient location.

The valve operator 18 of the invention is economical to manufacture, foolproof in operation, retrofittable to existing valve structure with a minimum of mechanical expertise, and dependable in operation.

It is appreciated that various modifications to the inventive concepts may be apparent to those skilled in the art without departing from the spirit and scope of the invention.

I claim:

1. An electric valve operator characterized by its ease of attachment to drain valve structure including an elongated valve neck having a valve operating stem reciprocally mounted therein movable between valve open and closed positions comprising, in combination, a base plate, valve neck mounting means defined on said base plate including a pair of spaced elements adapted to be located upon opposite sides of the valve neck, threaded fasteners interconnecting said elements for clamping said elements upon the valve neck, a housing enclosing a portion of said base plate, said threaded fasteners mounting said housing upon said base plate, a gear rack guide defined on said base plate adapted to be substantially parallel to the length of the neck and stem when said base plate is mounted on a valve neck, a toothed gear rack linearly reciprocally supported within said guide, a toothed gear rotatably mounted on said base plate meshing with said rack, a reversible electric motor mounted on said base plate drivingly connected to said gear, and a rack extension defined on said rack for attachment to the valve operating stem.

2. In an electric valve operator as in claim 1, said base plate being formed of a synthetic material.

3. In an electric valve operator as in claim 2, said gear rack guide comprising a pair of parallel spaced ribs molded upon said base plate.

4. In an electric valve operator as in claim 1, base plate positioning means defined on said base plate for engagement with the valve neck to properly locate said base plate upon the valve neck.

* * * * *